United States Patent [19]

Caron et al.

[11] Patent Number: 5,281,911
[45] Date of Patent: Jan. 25, 1994

[54] VEHICLE WHEEL SPEED SENSOR EMPLOYING A LOCATING PLATE

[75] Inventors: LaVerne A. Caron; James M. Kendzior, both of Kalamazoo, Mich.

[73] Assignee: Eaton Corporation, Cleveland, Ohio

[21] Appl. No.: 789,712

[22] Filed: Nov. 8, 1991

[51] Int. Cl.$^5$ .............. G01P 3/488; H02K 11/00; B60B 27/00
[52] U.S. Cl. .................. 324/174; 188/181 R; 310/68 B; 310/155; 301/108.1
[58] Field of Search ........... 324/163, 173, 174, 207.15, 324/207.25; 73/517 R, 518, 519; 310/155, 168, 68 B; 188/181 R, 181 A; 340/671; 301/108.1

[56] References Cited

U.S. PATENT DOCUMENTS

| | | | |
|---|---|---|---|
| 3,473,120 | 10/1969 | Ruof | 324/174 X |
| 4,986,605 | 1/1991 | Descombes | 324/173 X |
| 5,111,098 | 5/1992 | Peck et al. | 310/268 |

*Primary Examiner*—Gerard R. Strecker
*Attorney, Agent, or Firm*—L. H. Uthoff, Jr.

[57] ABSTRACT

A vehicle wheel speed sensor of the type using permanent magnets to generate a magnetic field having a magnetic path which is conducted through a plurality of teeth on a rotor into a plurality of teeth on a stator with relative motion therebetween where the frequency of the change in the magnetic reluctance varies at a frequency proportional to the wheel speed. The stator is mounted to the end of the axle spindle by way of a securing bolt so that the stator can be easily removed for service without disturbing the axle bearings. As a part of the stator assembly, a locating plate is provided which allows the operating gap between the rotor and the stator to be easily established upon assembly of the hub cap to the wheel hub by allowing the rotor to contact the locating plate when the hub cap securing bolts have been loosened and the axle is supported.

5 Claims, 2 Drawing Sheets

VEHICLE WHEEL SPEED SENSOR EMPLOYING A LOCATING PLATE

This invention relates to truck wheel speed sensor assemblies in general and specifically to a sensor assembly whose operating clearance is easily adjusted and whose axle mounted stator is designed for easy service or replacement.

BACKGROUND OF THE INVENTION

Prior art wheel speed sensors for vehicles have generally fallen into two broad categories, those employing either active or passive sensors. Active sensors require a power signal to be fed to a sensor component, whereas passive sensors need no outside power and usually consist of a coil surrounding a magnet material which is positioned in close proximity to a circular shaped element having a plurality of teeth which rotates with the wheel hub. The coil and magnet are mounted to a stationary part of the vehicle or axle assembly and the relative motion of the teeth in the rotor passing over a magnetized pole piece induces a change in reluctance which can be detected in an electronics package which is connected to the coil. A device of this type is described in U.S. Pat. No. 4,986,605, the disclosure which is expressly incorporated herein by reference, where a pulser and sensor unit are located inside the wheel hub mounted on the axle spindle in close proximity to a rotor connected to the wheel hub having a series of rectangular teeth.

Another type of passive wheel speed sensor is described in U.S. Pat. No. 3,887,046 and describes a sensor having a stator and a rotor where the stator is mounted on an axle and includes an electrical coil of wire surrounding the axle where the coil sets in a metal carrier having pole pieces and a plurality of magnets angularly disposed where the pole pieces are in close proximity to a multi-segmented rotor which is mounted to a hub cap which turns with the wheel hub.

A problem with these type of wheel speed sensors is that they require precision fabrication of the components so that, upon assembly, the limited clearance of the pole pieces to the rotor is maintained throughout the rotation of the wheel hub and hub cap assembly so that the signal due to the passing of the rotor teeth over the pole pieces is maximized.

Also, another problem with devices of this type is that the mounting of the stator piece is secured by the axle mount and is piloted on the outside diameter of the axle spindle which results in a large and complicated mounting system for the stator disc. If service of the stator is required, the prior art systems require that the spindle retention nut be disturbed which complicates the servicing process. Another problem occurs upon reassembly where the clearance between the rotor and the stator pole pieces is difficult to set and poor sensor performance is the potential result of that difficulty.

SUMMARY OF THE INVENTION

This invention provides a convenient method of securing the stator plate disc to the vehicle axle by way of a tapped pole in the axle centerline where the stator is piloted by the end of the axle shaft on an inside diameter surface machined into the stator and is held in place by a nut that engages a threaded shaft that extends and engages the threaded portion in the vehicle axle. In this manner, the stator assembly, which includes the coil and the magnets, is easily removed from the vehicle without disturbing the spindle nut or spindle bearing.

The invention also provides for a convenient method of setting the operating gap between the stator teeth and the teeth residing in the rotor where the stator assembly includes a clearance plate having an outside diameter approximately the same as that of the stator. Upon assembly, the hub cap is loosened and the rotor is allowed to contact the clearance plate due to the force of gravity acting on the hub cap while the axle is supported by a separate means (such as vehicle jack stands) instead of the vehicle wheel and tire assembly. Thereupon, the hub cap bolts are tightened and the vehicle is lowered upon the tires and wheels which results in a loading of the wheel hub bearings, thereby providing the desired operating gap between the stator and the rotor.

It is therefore, a provision of the invention to provide a truck wheel speed sensor that can be easily removed for servicing without disturbing the spindle nut.

Another provision of the invention is to provide a truck wheel speed sensor whose operating gap between the rotor and stator can be easily set and secured.

Still another provision of the present invention is to provide a truck wheel speed sensor assembly that can be easily removed and then reassembled to the vehicle axle with the correct operating gap between the stator and the rotor.

DETAILED DESCRIPTION OF THE PREFERRED EMBODIMENT

Figure 1:
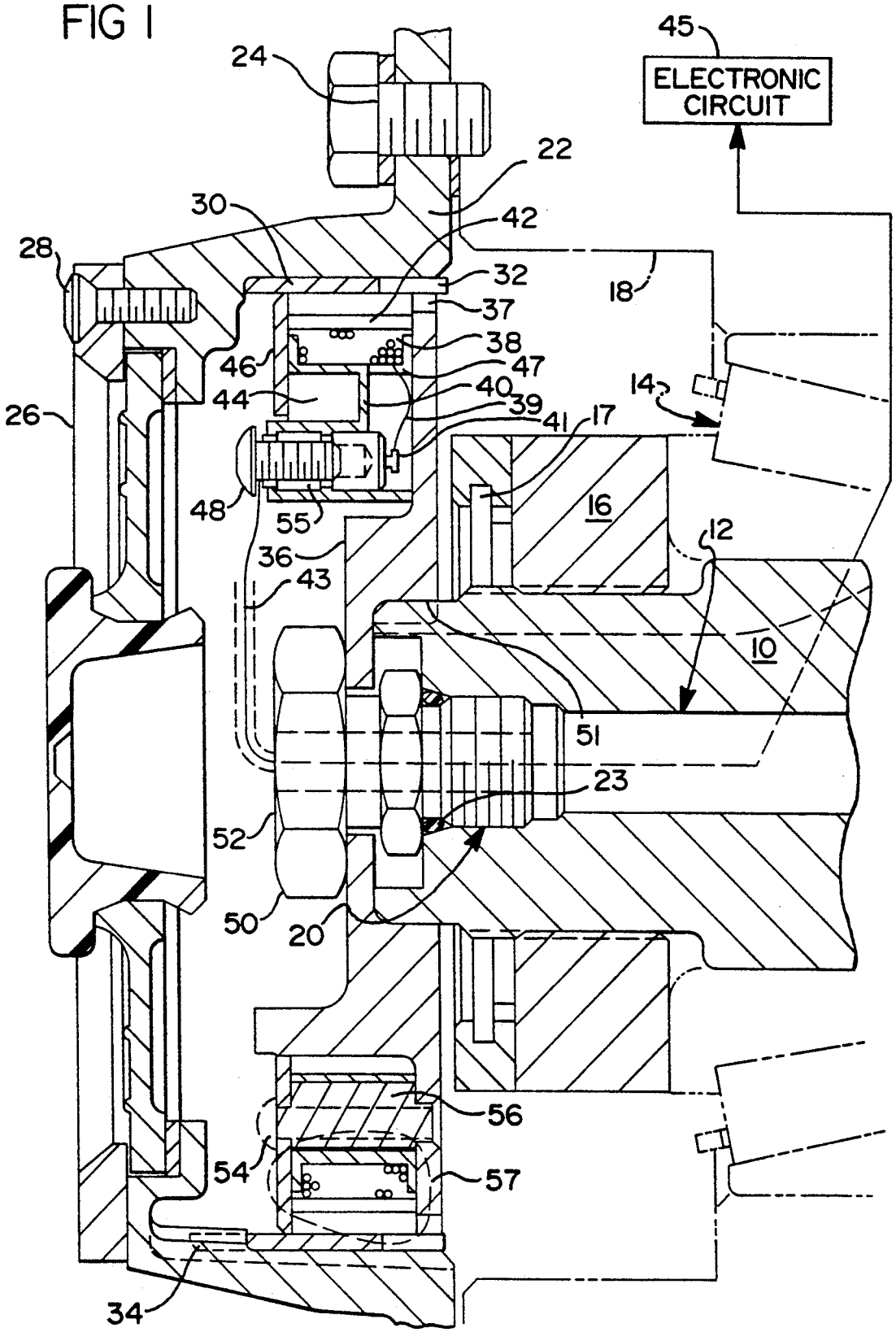
FIG. 1 is a cross-sectional view of the present invention and installed on a truck axle and wheel hub assembly.

Referring to FIG. 1, a typical installation of a truck wheel and hub assembly is shown mounted on an axle spindle (10) where the wheel hub (18) rotates about the axle spindle (10) by way of bearing member (14) where the wheel speed sensor of the present invention is carried on the axle spindle (10) and a hub cap (22) which is secured to the wheel hub (18) by way of a plurality of mounting bolts (24). The bearing member (14) is held in place and preloaded by spindle nut (16) which is secured in position by lock ring (17). The truck axle spindle (10) contains an axial hole (12) running along the centerline and ending with a tapped region (20) so as to accept a threaded bolt which is sealed by an "O"-ring (23). The hub cap cover (26) is secured to the hub cap (22) with a plurality of securing bolts (28). The function of the hub cap cover (26) is to prevent contaminants from entering the speed sensor and bearing components.

The speed sensor of the present invention includes a number of components that are carried inside a cavity formed by the hub cap (22), the hub cap cover (26) and the wheel hub (18). A rotor (30) is made of magnetically conductive material and has a thin cylindrical shape that is contained along the inside diameter of the hub cap (22) and is secured and prevented from rotating by a slotted portion (34) that engages a raised portion in the wheel hub cap (22). The rotor (30) includes a multiplicity of teeth (32) that are uniform in dimension and extend along an axis parallel to the axle spindle (10) centerline and provide a magnetic flux path that is segmented by the voids between the teeth (32). The rotor (30) is constructed of a material that easily conducts magnetic flux such as SAE 1010 steel or a high iron content powder metal material.

Figure 2:
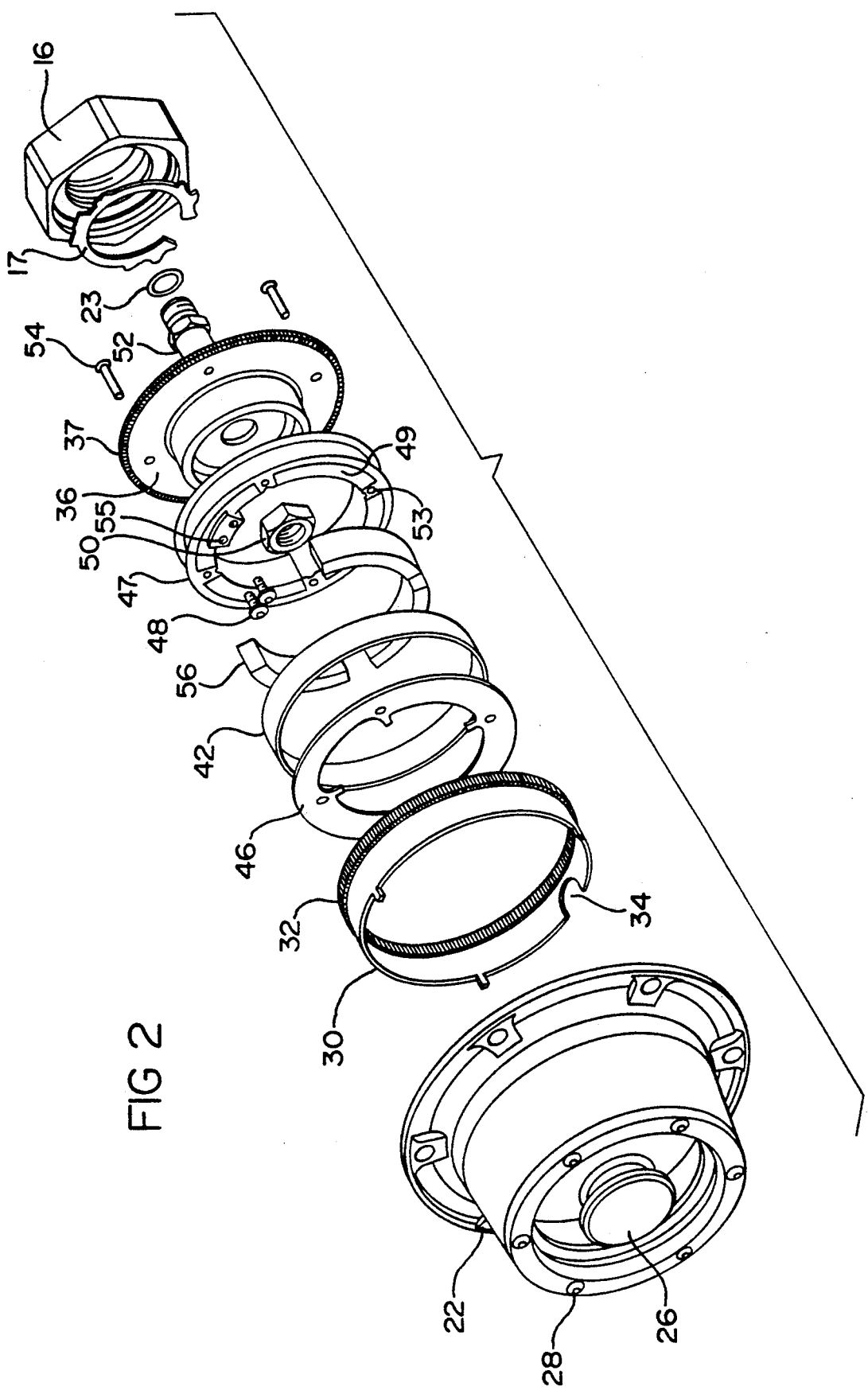
FIG. 2 is a perspective view of the wheel speed sensor assembly of the present invention and the spindle nut and the hub cap.

The stator disc (36) is secured to and piloted by the axle spindle (10) with a bolt (52) which engages the threads of the axle spindle (10) at tapped region (20) where a securing nut (50) is threaded onto the end of the securing bolt (52) and secures the stator disc (36) to the axle spindle (10). Other components are mounted to the stator disc (36) and include an electrical coil (38) which consists of a multiplicity of turns of electrical wire which encircle the axle spindle (10) center line and are wound on the outside section of support housing (47) which is attached to the stator disc (36) and is covered by cover ring (42). The output leads (39) of electrical coil (38) are routed to electrical terminals (41) which are in contact with two lead bolts (48) which are electrically connected to two lead wires (43) which are routed through the bolt (52) into the axial hole in the axle spindle (10). The two lead bolts (48) are supported in the terminal support housing (40) which extends inwardly from the support housing (47) defining a void space (44) and includes threaded holes (55) which engage the lead bolts (48). The lead wires (43) are routed to a commonly used signal conditioning circuit whose output is routed to any number of truck systems such as an anti-lock braking system or an electronic transmission control unit. Also contained on the stator disc (36) are a number of magnets (56) which are shaped to fit into a like number of cavities contained in support housing (47) which is more clearly shown in FIG. 2. The magnets (56) are shaped in the form of segments of an annular ring. Three magnets (56) are shown in FIG. 2 which fit into a like number of appropriately shaped cavities (49) to hold the magnets (56) in position such that like magnetic poles face axially inward. The magnets are separated by mounting segments (53) which surround the rivets (54) which secure the stator disc (36) and the support housing (47) to the spacer plate (46). The magnets (56) are arranged so that the north poles face in the same direction relative to the stator disc (36) and are inserted in cavities (49) formed in the support housing (47). The support housing (47) can be made of a plastic material which is non-magnetic in nature and carries a pair of metal inserts (51) which are internally drilled and tapped to accept the terminal lead bolts (48).

On the outside face of the support housing (47) is a spacer plate (46) which is secured to the support housing (47) by a plurality of rivets (54) which are secured on one side at the support housing (46) and pass through the support housing (47) and are secured on the opposite side of the stator disc (36). The spacer plate (46) has an outside diameter that is approximately the same as the stator disc (36) which are in turn slightly smaller than the internal diameter of the rotor (30).

The stator disc (36) contains a multiplicity of stator teeth (37) evenly spaced and of uniform dimension which are preferably of the same number of teeth as are contained at the peripheral edge of the rotor (30). The stator disc (36) is secured to the end of the axle spindle (10) by way of a securing nut (50) which is threaded on the bolt (52) and is piloted on the outside diameter of the end portion of axle spindle (10) where a key (51) is extended from the stator disc (36) into a key way in the axle spindle (10) to prevent relative rotation between the stator disc (36) and the axle spindle (10).

In operation, the rotor (30) rotates with the truck wheel which is mounted to the wheel hub (18). The stator disc (36) is stationary relative to the axle spindle (10) and thus, there is relative motion between the rotor (30) and the stator disc (36) where the rotor teeth (32) pass over the stator teeth (37) and thereby change the magnetic reluctance from a high value to a low value as the rotor teeth (32) and the stator teeth (37) align one with another. A magnetic field is produced by the magnets (56) and is shown by magnetic flux line (57). A magnetic reluctance variation causes a voltage to be induced in the stator electrical coil (38) where this voltage is routed to an electronics package by way of output leads (39) and into electrical terminals (41) and into lead wires (43) which are then connected to an electronic circuit (45). The frequency of the induced voltage increases proportionally with the speed of the truck wheel, thus allowing a vehicle speed to be calculated.

The magnetic reluctance is minimized when the rotor teeth (32) coincide or are in alignment with the stator teeth (37) and is maximized when the rotor teeth (32) are in alignment with the gap between the stator teeth (37). Conventional signal conditioning and measurement techniques are used to interpret the signal generated in the electrical coil (38).

During the initial assembly process or upon reassembly after servicing, the operating gap between the stator teeth (37) and the inside diameter of the rotor (30) can be easily established with the use of a spacer plate (46). The truck axle is supported so that none of the vehicle weight is carried on the wheel hub (18) and the wheel assembly mounted thereto. This action unloads the wheel bearings (14) so that the weight of the wheel hub (18) and the hub cap (22) cause the free play in the axle bearing (14) to be taken up on a side opposite to that when the vehicle is in a normal operating configuration. The mounting bolts (24) that secure the hub cap (22) to the wheel hub (18) are loosened so that the hub cap can be shifted around to a slight degree and the wheel cap (22) is then shifted to one side so that the rotor (30) comes in contact with the spacer plate (46) at a point opposite that established by a line running from the normal tire-road contact point through the centerline of the axle and where it intersects the rotor (30). Once the hub cap (22) has been shifted so that the rotor (30) contacts the spacer plate (46) at the point described supra, the hub cap mounting bolts (24) are tightened. Once the axle is lowered so that the tire comes in contact with the road surface and supports the vehicle, the free play in the wheel bearing (14) allows the rotor (30) to separate from the spacer plate (46) so that the proper operating clearance between the rotor teeth (32) and the stator teeth (37) is established. Thus, the spacer plate (46) functions to set the operating clearance between the rotor (30) and the stator (36) and also conducts the magnetic field generated by the magnets (56) and must be fabricated from a material that is magnetically conductive.

Although the invention has here and above been described with respect to the illustrated embodiment, it will be understood that the invention is capable of modification and variation, and is therefore intended as limited only by the following claims.

What is claimed is:

1. A vehicle wheel speed sensor comprising:
   a wheel hub rotationally mounted to a vehicle axle spindle having an axial passageway therethrough;
   a hub cap secured to said wheel hub forming a cavity;

a rotor having an annular shape and having a solid section and a plurality of rotor teeth extending from said solid section in an axial direction and mounted in said cavity and attached to an inner surface of said hub cap;

a circular stator disc having a plurality of stator teeth formed on a peripheral edge nonrotatably attached to said axle spindle and having an outer diameter slightly smaller than an inner diameter of said rotor;

a plurality of magnets having a curved inner and a curved outer radial surface mounted on said stator disc, said magnets oriented having matching magnetic poles facing axially inward to create a magnetic field which travels through said stator teeth and said rotor teeth;

an annular sensing coil having a multiplicity of turns of electrical wire surrounding the centerline of said axle and radially interposed between said magnets and said rotor and attached to said stator disc interacting with a magnetic field created by said magnets thereby generating a signal in said sensing coil rising and falling in amplitude according to the alignment of said rotor teeth with said stator teeth;

a lead wire connected to said sensing coil and extending into said spindle axial passageway and connected to an electronic circuit;

securing means holding said stator disc to said axle;

a locating plate nonrotatably attached to said stator disc, said locating plate having a circular peripheral edge in close proximity to said rotor solid section, said annular sensing coil interposed between said locating plate and said stator disc;

wherein said locating plate contacts said rotor solid section when the vehicle axle is supported thereby unloading said wheel hub; and wherein said locating plate has a relatively small operating clearance with said rotor solid section when the vehicle axle is loaded for operation.

2. The vehicle wheel speed sensor of claim 1, wherein said securing means is a threaded bolt engaging a threaded region in said spindle axial passageway.

3. The vehicle wheel speed sensor of claim 1, wherein said rotor is made of a ferromagnetic material, said rotor cylindrically shaped surrounding said stator discs.

4. The vehicle wheel speed sensor of claim 1, wherein said stator disc is made of a high iron content powdered metal material.

5. A method of positioning a vehicle wheel speed sensor mounted on a wheel hub cap and axle comprising:

providing a wheel hub rotationally mounted to said axle supported with a bearing;

providing a plurality of hub cap retaining bolts securing said hub cap to said wheel hub;

providing a wheel speed sensor comprised of a circular stator disc nonrotatably secured to said axle using a fastening means and having a multiplicity of stator teeth at an outer edge and an annular sensing coil mounted to said stator disc, an annular rotor nonrotationally secured to an inner surface of said wheel hub cap, said rotor having an inside diameter slightly larger than the outer diameter of said stator disc and having a multiplicity of axially extending rotor teeth, and an annular locating plate affixed to said stator disc and shaped to fit inside and in close proximity to said rotor and having a diameter approximately the same as said stator disc, said sensing coil interposed between said locating plate and said stator disc and connected to an electronic circuit, and at least one permanent magnet adjacent to said sensing coil providing a magnetic field in said locating plate, said sensing coil, said rotor teeth, said stator teeth and said stator disc wherein the flux path reluctance varies in amplitude according to the alignment between the stator teeth and the rotor teeth;

loosening said hub cap retaining bolts;

supporting said axle against a supporting surface so as to remove the weight of said vehicle from said wheel hub;

moving said hub cap so that said locating plate contacts said rotor at a point defined by the intersection of a line perpendicular to said supporting surface passing through a centerline of said axle and intersecting said inside diameter of said rotor;

tightening said hub cap retaining bolts.

* * * * *